United States Patent

[11] 3,530,895

| [72] | Inventor | Arthur A. Rothrock |
| --- | --- | --- |
| | | Portland, Oregon |
| [21] | Appl. No. | 704,473 |
| [22] | Filed | Feb. 9, 1968 |
| [45] | Patented | Sept. 29, 1970 |
| [73] | Assignee | Dupar Dynamics Division of Palmer Supply Co. |
| | | Seattle, Washington |

[54] AUTOMATIC FLUID PRESSURE SWITCHING VALVE
3 Claims, 4 Drawing Figs.
[52] U.S. Cl. ............................................. 137/625.63, 251/282
[51] Int. Cl. .............................................. F16k 11/07, F16k 39/04
[50] Field of Search ........................................ 137/625.63

[56] References Cited
UNITED STATES PATENTS
2,455,315 11/1948 Rose et al. ............... 137/625.63X

| 3,060,969 | 10/1962 | Aslan | 137/625.63 |
| 2,355,434 | 8/1944 | Harter | 137/625.63 |
| 3,013,539 | 12/1961 | Rethmeier | 137/625.63 |
| 3,027,880 | 4/1962 | Van Den Bussche | 137/625.63 |
| 3,163,179 | 12/1964 | Ljunggren | 137/625.63X |

*Primary Examiner*—Henry T. Klinksiek
*Attorney*—Oliver D. Olson

ABSTRACT: A hollow switching valve body houses a hollow sleeve freely reciprocative therein, and a control stem extends slidably through the body and sleeve. A pair of spaced conductor grooves in the sleeve cooperate with an inlet port, a pair of outlet ports and an exhaust port in the body to deliver fluid under pressure from the inlet port selectively to the pair of outlet ports and exhaust port. A by-pass groove in the movable control stem cooperates with a by-pass port in the sleeve between the conductor grooves to by-pass fluid under pressure from the inlet port selectively to opposite ends of the sleeve to move the latter and switch the delivery of fluid under pressure from one outlet port to the other.

Arthur A. Rothrock
INVENTOR

Arthur A. Rothrock
INVENTOR
BY
Agent

AUTOMATIC FLUID PRESSURE SWITCHING VALVE

BACKGROUND OF THE INVENTION

This invention relates to fluid pressure valves, and more particularly to valves capable of reversing the flow of fluid pressure through a fluid pressure system.

Fluid pressure switching valves provided heretofore are characterized disadvantageously by several factors. They are generally of complex and costly construction. They require relatively long movement of a control member to effect switching, and movement of the control member is resisted by the counteraction of the fluid pressure being controlled. The fluid pressure causes moving parts of such valves to be hammered against stationary parts of the valve, thereby creating undesirable noise and vibration, as well as reducing the operating life of the valve and necessitating frequent and costly maintenance and repair.

SUMMARY OF THE INVENTION

In its basic concept, the valve of this invention utilizes a short stroke control member to by-pass fluid pressure selectively to opposite ends of a sleeve chamber in a valve body to move a sleeve therein to direct fluid pressure from an inlet in the body selectively to each of a pair of outlets in the body and to direct fluid from the other outlet to exhaust.

It is by virtue of the foregoing basic concept that the principal objective of this invention is achieved, namely to overcome the disadvantages of prior switching valves, as discussed hereinbefore.

The foregoing and other objects and advantages of this invention will appear from the following detailed description, taken in connection with the accompanying drawings of one embodiment.

DESCRIPTION OF THE ILLUSTRATED EMBODIMENT

Figure 1:
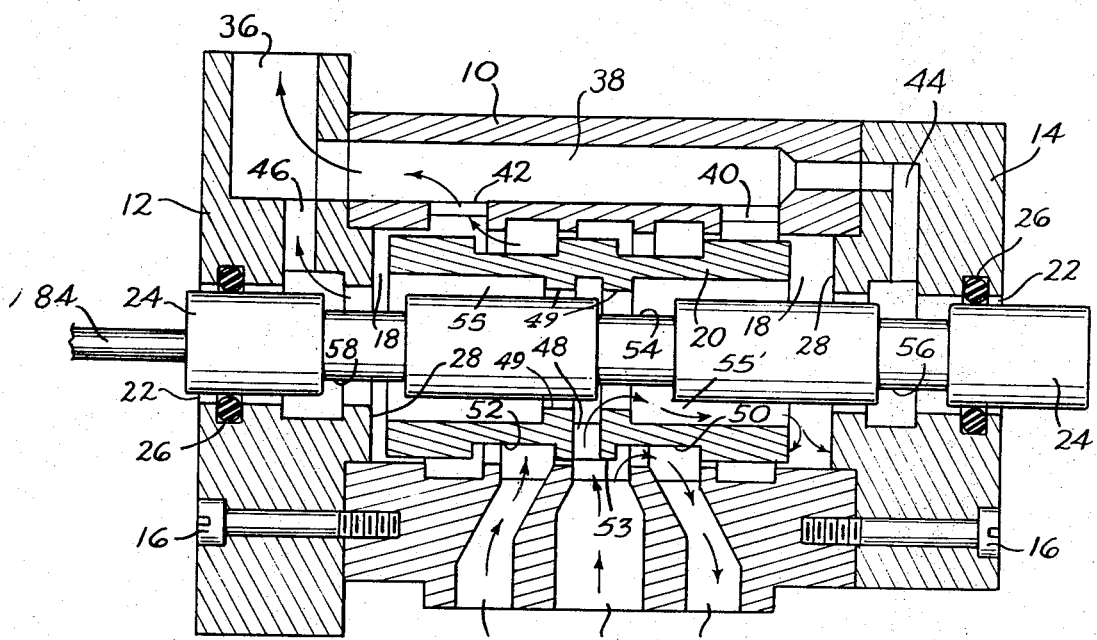
FIGS. 1, 2 and 3 are longitudinal sectional views of a switching valve embodying the features of the present invention, the components being shown in various positions of adjustment.

The valve includes a hollow body comprised of the central section 10 and end sections 12 and 14, secured together by such means as screws 16. Suitable fluid pressure seals (not shown) are interposed between the sections. The body defines an internal sleeve chamber 18. Confined within the chamber and reciprocative freely therein is a hollow sleeve 20. The longitudinal bore in the sleeve is in alignment with aligned end bores 22 in the body to receive freely therethrough the elongated control stem 24. Resilient O-rings 26 are mounted in annular grooves in the end bores and provide fluid pressure seals between the body and stem.

The end bores 22 communicate with the sleeve chamber 18 and are of reduced diameter, thereby providing longitudinally spaced shoulders 28 which define the longitudinal ends of the chamber. The sleeve 20 is shorter than the distance between the end shoulders, whereby to permit longitudinal reciprocation of the sleeve freely within the chamber.

The body is provided with a fluid pressure inlet port 30 and a pair of longitudinally spaced outlet ports 32 and 34 located on opposite sides of the inlet port. These inlet and outlet ports communicate directly with the sleeve chamber 18. The body also includes an exhaust port 36 which communicates with the sleeve chamber through the exhaust channel 38 and the longitudinally spaced exhaust openings 40 and 42. The exhaust channel also communicates with the end bores 22 through the exhaust openings 44 and 46.

The hollow sleeve is provided with a fluid pressure by-pass passageway port 48 which registers with an annular groove defined between the spaced inner lands 49 and with the fluid pressure inlet port 30 throughout the reciprocative movement of the sleeve. In the outer surface of the sleeve there is provided a pair of longitudinally spaced annular fluid passageway conductor grooves 50 and 52 separated by a land 53 which contains the by-pass port. The land and one of these grooves 50 are arranged to releasably seal both the inlet port 30 from the outlet port 32 and said outlet port 32 from the exhaust opening 40. The land and other conductor groove 52 are arranged to releasably seal both the inlet port 30 from the other outlet port 34 and said other outlet port 34 from the exhaust opening 42.

The control stem 24 is provided with an annular fluid pressure by-pass passageway groove 54 which cooperates with the by-pass passageway port 48 in the sleeve to direct fluid pressure selectively to opposite ends of the sleeve and chamber 18 through the by-pass passageways 55 and 55' extending outward from the lands 49. A pair of fluid exhaust grooves 56 and 58 in the control stem, spaced longitudinally on opposite sides of the by-pass groove 54, cooperate with their adjacent lands to releasably seal the sleeve chamber 18 and end bores 22 from the exhaust openings 44 and 46, respectively.

Figure 4:
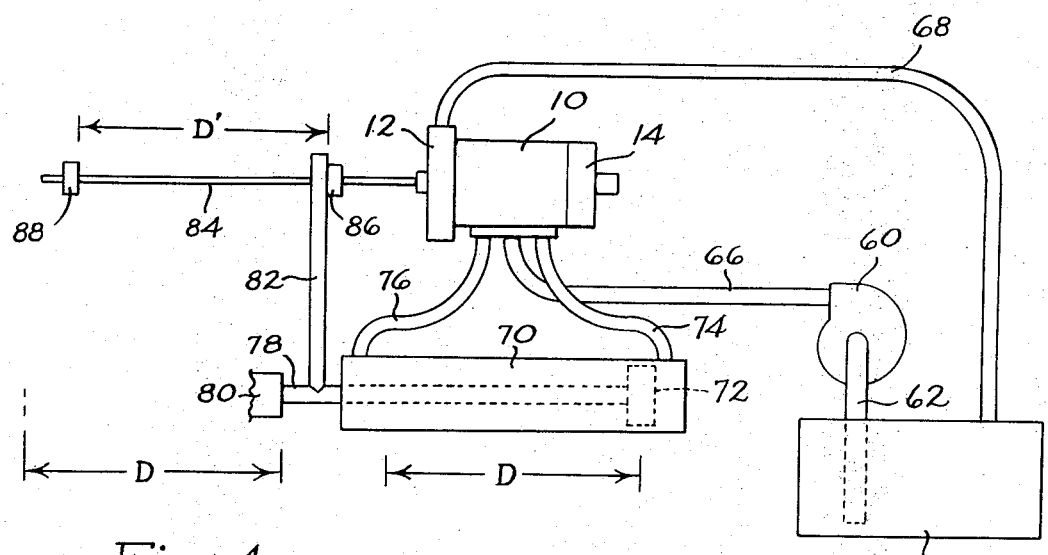
FIG. 4 is a schematic representation illustrating the use of the switching valve in controlling automatically the reciprocative movement of a load-driving piston-cylinder unit.

The operation of the switching valve described hereinbefore is best explained by reference to the fluid pressure, reciprocating drive assembly illustrated in FIG. 4. Therein is shown an hydraulic pump 60 having its inlet connected through the conduit 62 to a reservoir 64 of hydraulic fluid. The pump outlet is connected through the conduit 66 to the inlet port 30 in the valve body. Exhaust conduit 68 communicates the exhaust port 36 in the valve body with the reservoir 64.

An elongated fluid pressure cylinder 70 contains a piston 72 slidably therein for longitudinal reciprocative movement between the opposite ends of the cylinder. One end of the cylinder is connected through the conduit 74 to the outlet port 32 in the valve body, and the opposite end of the cylinder is connected through the conduit 76 to the other outlet port 34 in the valve body.

A piston rod 78 extends from the piston outward through one end of the cylinder, and its outer end is connected to a work member 80 to be reciprocated. An arm 82 projects laterally from the piston rod and its outer end registers with a rod extension 84 secured to and projecting from one end of the valve control stem 24. A pair of stop members 86 and 88 are secured adjustably to the rod extension, being spaced apart a distance D' corresponding substantially to the length D of reciprocation of the piston and hence the work member. The outer end of the arm is confined between the stop members for abutment against the latter at the opposite extremes of desired reciprocation.

Let it be assumed that the piston 72 has just been returned to the right hand end of the cylinder 70 and that abutment of the arm 82 against the stop 86 has moved the control stem 24 to the right, as illustrated in FIG. 1. Hydraulic pressure from the pump 60 thus enters the inlet port 30 and passes through the by-pass port 48 and passageway 55' to the right hand end of the sleeve 20 and chamber 18. The sleeve thus is moved toward the left to the position illustrated in FIG. 1, whereupon the conductor groove 50 provides a passage between the inlet port 30 and the outlet port 32 to deliver fluid pressure to the right hand end of the cylinder. As the piston 72, and hence the work member 80, move toward the left, fluid is exhausted from the left end of the cylinder through the conduit 76 and outlet port 34, thence through the conductor groove 52, exhaust opening 42 and channel 38, exhaust port 36 and conduit 68, to the reservoir 64.

As the sleeve 20 continues to move toward the left from the position illustrated in FIG. 1, the land area to the left of the by-pass groove 54 in the control stem 24 closes the by-pass port 48 in the sleeve, before the left end of the sleeve abuts the shoulder 28 defining the left end of the chamber. By thus eliminating physical contact of these surfaces, the noise of hammer action and the physical damage to the parts resulting therefrom are eliminated.

Figure 2:
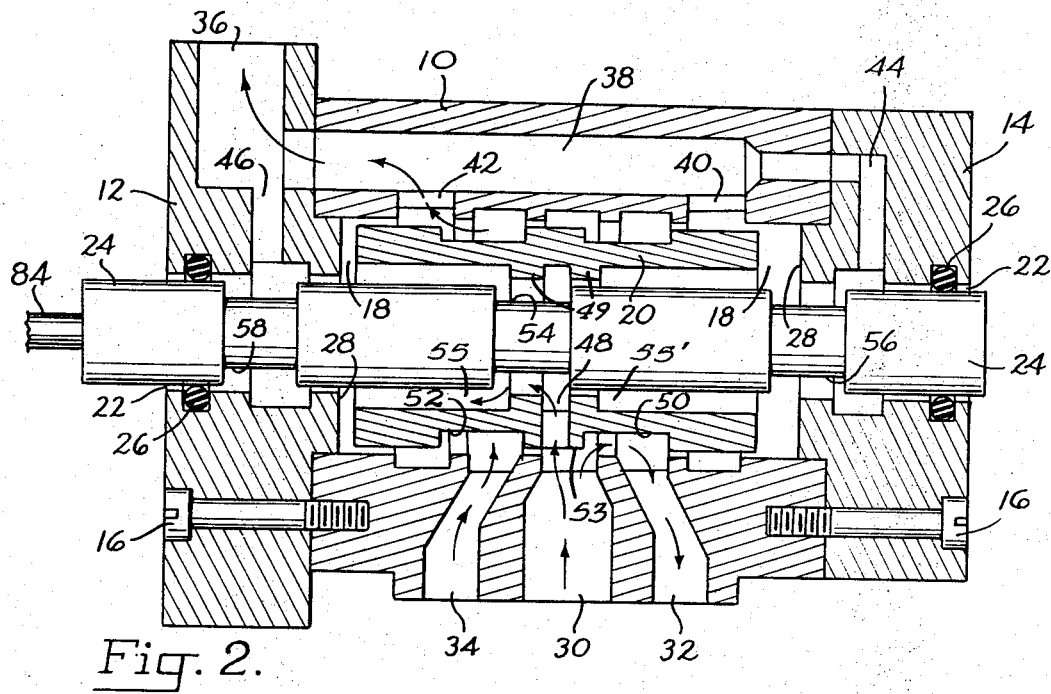
Figure 3:
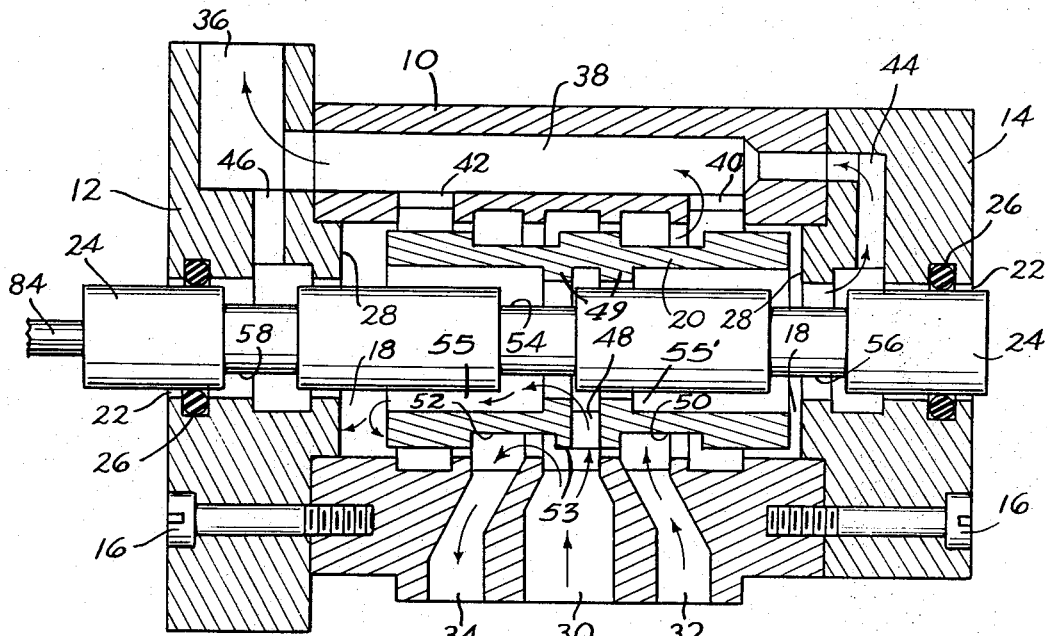

With the valve components remaining in the positions illustrated in FIG. 1, the piston 72 and work piece 80 are moved toward the left, until the arm 82 abuts the stop member 88 and moves the control stem 24 toward the left, to the position illustrated in FIG. 2. It is to be noted that the sleeve 20 still is in its leftward position of FIG. 1. However, with the control stem 24 moved to its leftward position, the by-pass groove 54 now communicates the by-pass port 48 with the left end of the sleeve and chamber. The sleeve thus immediately is moved toward the right (FIG. 3). Before the right hand end of the sleeve abuts the shoulder 28 at the right hand end of the chamber, the land adjacent the right side of the by-pass groove 54 in the control stem closes the by-pass port 48, as previously described.

The sleeve having been moved toward the right, the inlet port 30 is sealed from the right hand outlet port 32, and the conductor groove 52 has interconnected the inlet port 30 and the left hand outlet port 34. Fluid pressure thus is delivered to the left hand end of the cylinder, causing the piston and work piece to be moved toward the right. Fluid ahead of the piston is exhausted through the conduit 74, outlet port 32, conductor groove 50, exhaust opening 40 and channel 38, exhaust port 36 and conduit 68, to the reservoir 64.

It is to be noted from a comparison of FIGS. 1, 2 and 3, that the extent of movement of the control stem 24 and sleeve 20 is quite short. This minimizes the switching transition time and correspondingly minimizes the difference between the spacing D' of the stop members and the distance D of reciprocative movement of the piston and work piece.

The valve system is balanced hydraulically or pneumatically, whichever fluid pressure source is employed. Since the lands defining the grooves 54, 56 and 58 in the control stem 24 are of uniform diameter, as illustrated in the drawings, fluid pressure in said grooves exert equal forces on the stem in both longitudinal directions. Accordingly, the fluid pressure reacting against the control stem 24 is balanced in all directions and at all times, thereby eliminating fluid pressure resistance to movement of the control stem.

Of considerable importance in the present invention is the arrangement by which the space between the inner lands 49 communicating with by-pass port 48 is closed by the lands of the stem 24 defining groove 54 to shut off fluid pressure from inlet port 30 to the chamber 18 before the ends of the sleeve 20 are driven against the confronting shoulders 28 of the chamber 18. By this means the valve operates quietly, with minimum vibration and shock and without damage to the valve components.

It will be apparent to those skilled in the art that various changes may be made in the size, shape and arrangement of parts described hereinbefore without departing from the spirit of this invention.

I claim:

1. A fluid pressure switching valve, comprising:
   a. a hollow body having a fluid inlet port, a pair of fluid outlet ports one on each side of the inlet port, an exhaust port and a sleeve chamber;
   b. a hollow sleeve shorter than and mounted freely in the sleeve chamber for longitudinal reciprocation therein;
   c. the sleeve having three longitudinally spaced external lands defining between them two longitudinally spaced external fluid passageways each continuously communicating with a different one of the outlet ports, the external passageways functioning upon movement of the sleeve to a position adjacent one end of the chamber to communicate one outlet port with the inlet port and the other outlet port with the exhaust port, and upon movement of the sleeve to a position adjacent the opposite end of the chamber to communicate said other outlet port with the inlet port and said one outlet port with the exhaust port;
   d. the sleeve also having a pair of internal lands aligned with the central external land and separating longitudinally spaced by-pass passageways extending to the opposite ends of the sleeve;
   e. the sleeve having a by-pass port extending through the central external land and continuously communicating the inlet port with the space between the internal lands;
   f. a control stem in the sleeve movable longitudinally relative to the body and sleeve;
   g. the stem having four longitudinally spaced lands of uniform diameter defining between them three longitudinally spaced grooves;
   h. the central groove in the stem communicating the by-pass port in the sleeve selectively with the by-pass passageways in the sleeve during relative longitudinal movement of the sleeve and stem, for directing fluid pressure from the inlet port to one end of the sleeve chamber when the stem is moved toward the same end of the chamber, whereby to effect movement of the sleeve toward the opposite end of the chamber; and
   i. each of the end grooves in the stem communicating the associated end of the sleeve chamber with the exhaust port during movement of the sleeve toward said end of the chamber.

2. The switching valve of claim 1 wherein the spaced lands of the stem defining the central groove close the space between the internal lands of the sleeve before the latter reaches the opposite ends of the chamber during reciprocation of the sleeve.

3. The switching valve of claim 1 wherein the control stem extends through aligned openings in the opposite ends of the body, and fluid pressure seal means are interposed between said openings and stem outward of the end grooves in the stem.